(12) United States Patent
Ohtani et al.

(10) Patent No.: US 6,940,686 B2
(45) Date of Patent: Sep. 6, 2005

(54) MAGNETIC RECORDING AND REPRODUCING DEVICE

(75) Inventors: Yuko Ohtani, Naniwu-ku (JP); Atsushi Imai, Takatsuki (JP); Kisaburo Kurobe, Osaka (JP)

(73) Assignee: Matsushita Electric Industrial Co., Ltd. (JP)

( * ) Notice: Subject to any disclaimer, the term of this patent is extended or adjusted under 35 U.S.C. 154(b) by 161 days.

(21) Appl. No.: 10/148,628

(22) PCT Filed: Dec. 8, 2000

(86) PCT No.: PCT/JP00/08731

§ 371 (c)(1),
(2), (4) Date: May 31, 2002

(87) PCT Pub. No.: WO01/43133

PCT Pub. Date: Jun. 14, 2001

(65) Prior Publication Data

US 2002/0171971 A1 Nov. 21, 2002

(30) Foreign Application Priority Data

Dec. 9, 1999 (JP) .......................... 11-349579

(51) Int. Cl.⁷ .............................. G11B 33/14
(52) U.S. Cl. .................. 360/90; 360/97.02; 360/96.5
(58) Field of Search .................. 360/90, 93, 96.5, 360/97.02

(56) References Cited

U.S. PATENT DOCUMENTS

| | | | |
|---|---|---|---|
| 4,626,941 A | 12/1986 | Sawada et al. | |
| 4,789,913 A * | 12/1988 | Gregory et al. | 360/97.03 |
| 5,135,772 A | 8/1992 | Garrison | |
| 5,229,899 A | 7/1993 | Brown et al. | |
| 5,331,487 A | 7/1994 | Gregory et al. | |
| 5,680,273 A | 10/1997 | Wong | |
| 6,096,694 A * | 8/2000 | Tei et al. | 508/562 |

FOREIGN PATENT DOCUMENTS

| | | | |
|---|---|---|---|
| EP | 0 302 606 A2 | 2/1989 | |
| EP | 458528 A1 * | 11/1991 | ........... G11B/23/50 |
| EP | 0 605 344 A2 | 7/1994 | |
| JP | 60182573 A1 * | 9/1985 | ........... G11B/21/21 |
| JP | 62012982 A1 * | 1/1987 | ........... G11B/33/14 |
| JP | 04291080 A * | 10/1992 | ........... G11B/33/12 |
| JP | 5-86005 | 12/1993 | |
| JP | 05342841 A1 * | 12/1993 | ........... G11B/33/14 |
| JP | 06096573 A1 * | 4/1994 | ........... G11B/33/14 |
| JP | 07065536 A | 3/1995 | |
| JP | 07073659 A1 * | 3/1995 | ........... G11B/33/12 |
| JP | 08045238 A * | 2/1996 | ........... G11B/25/04 |
| JP | 11-501336 | 2/1999 | |
| WO | WO 96/21710 | 7/1996 | |

\* cited by examiner

Primary Examiner—William J Klimowicz
(74) Attorney, Agent, or Firm—Steptoe & Johnson LLP

(57) ABSTRACT

A porous impregnation material (14) impregnated with a gaseous-phase lubricant that vaporizes at an atmosphere temperature within an outer case (2) is disposed in the inside of the outer case (2) that incorporates a tape mechanism (1) having a magnetic head such as a rotary video head (5). This allows the magnetic head to be in a state of being protected by a coating film of the gaseous-phase lubricant, thereby eliminating the adhesion of foreign substances other than the gaseous-phase lubricant to the magnetic head. As a result, decrease in the reading precision of magnetic data to be caused by the foreign substances can be prevented.

8 Claims, 2 Drawing Sheets

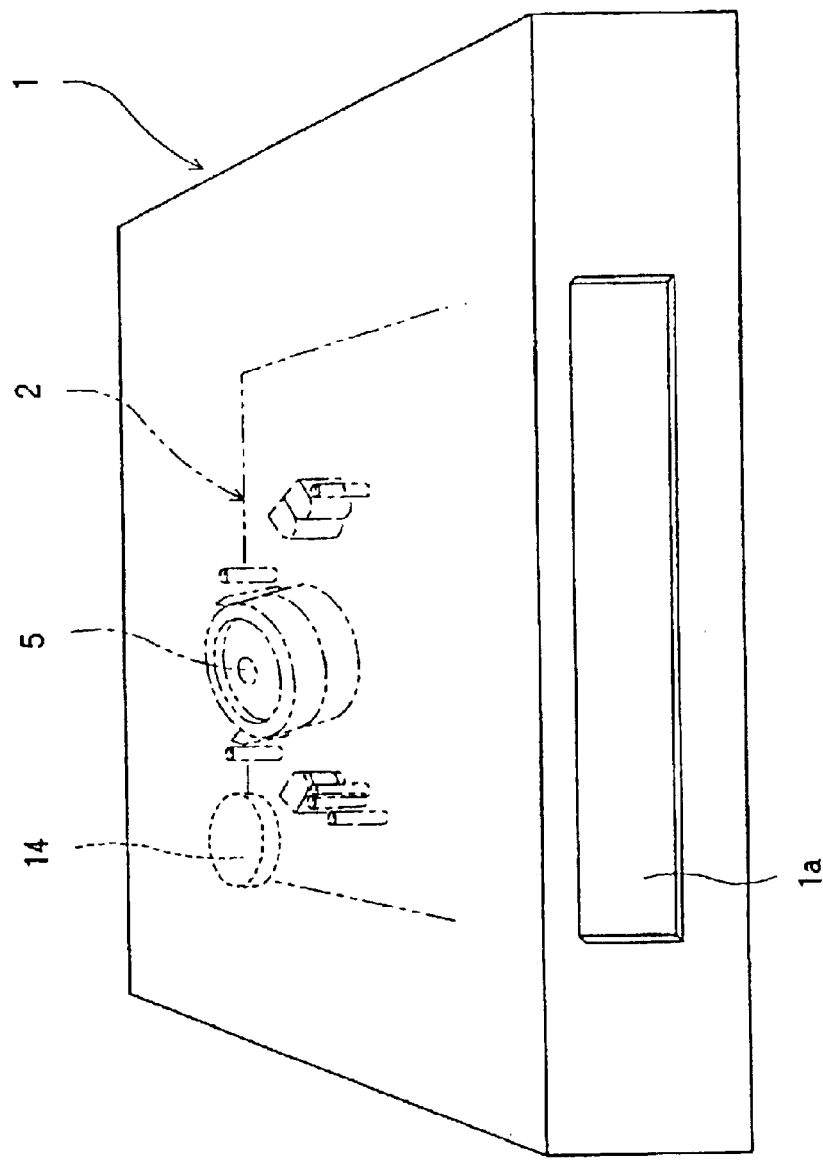

MAGNETIC RECORDING AND REPRODUCING DEVICE

TECHNICAL FIELD

The present invention relates to a magnetic recording and reproducing device having a magnetic head, such as a tape recorder or a video tape recorder.

BACKGROUND ART

In a magnetic recording and reproducing device such as a tape recorder or a video tape recorder, a magnetic tape is run to be in sliding contact with a magnetic head so as to convert an electric signal to a magnetic signal or a magnetic signal to an electric signal.

However, if a magnetic recording and reproducing device such as mentioned above is continued to be utilized, foreign substances adhere to a sliding surface of the magnetic head, and decrease of reproduced signals occurs by the adhesion layer. The adhering foreign substances are a whited substance generated in accordance with sliding between the magnetic head and the magnetic tape, and are regarded as being mainly composed of oxides produced by adhesion and oxidation of silicone, which is present in a slight amount in air, by frictional heat at the time of sliding or by minute energy of static electricity.

Conventionally, such adhesion of foreign substances was not so large a problem; however, in recent years, according as the signal of the magnetic recording and reproducing device changes from analog to digital, or according as the recording density of the magnetic tape increases, the design precision of the magnetic head or the like is becoming severer, so that even if a minute foreign substance adheres to the magnetic head, it will have a large influence on the reading precision of the magnetic data.

Particularly, if a metal vapor deposition tape capable of high-density recording is used as the magnetic tape, the adhesion of foreign substances to the magnetic head will be much, and often has an influence on the data reading precision. This seems to be due to the fact that, since the magnetic head and the metal vapor deposition tape are both made of metal materials, the heat generated by friction is large, and the amount of generated oxide is large. For this reason, prevention or reduction of adhesion of foreign substances to the magnetic head is an objective to be achieved.

Restraint of the adhesion of oxides is disclosed also in Publication of Unexamined Japanese Patent Application No. 5-86005; however, the oxides herein referred to are a blacked substance produced by oxidation of an organic substance being present in air and having an unsaturated bond by an extremely large energy such as a spark at an electric contact point between a brush and a commutator, and degrade the electrical conduction state of the electric contact point. As compared with this blacked substance, the aforesaid whited substance is extremely smaller, and does not have a large influence on the electrical conductivity even if it is generated at the electric contact point, so that the problem caused by the whited substance is different from that caused by the blacked substance.

The object of the present invention is to provide a magnetic recording and reproducing device that can restrain the adhesion of foreign substances to the magnetic head.

DISCLOSURE OF THE INVENTION

In order to achieve the aforesaid object, the magnetic recording and reproducing device of the present invention is characterized in that a gaseous-phase lubricant that vaporizes at an atmosphere temperature within a case is disposed in the inside of the case that incorporates a mechanism having a magnetic head.

As the gaseous-phase lubricant, those which vaporize at an atmosphere temperature at the time the magnetic recording and reproducing device is used under a normal use environment at $-10°$ C. to $+60°$ C., which fills the inside of the case with an atmosphere of the gaseous-phase lubricant, and which is, even if oxidized, decomposed into water and carbon dioxide and completely vaporizes away, are used.

By disposing such a gaseous-phase lubricant in the inside of the case, a part of the gaseous-phase lubricant adheres to the surface of the magnetic head to generate a state such that a coating film of the lubricant is formed, so that silicone and others present in air do not adhere to the magnetic head.

If frictional force is generated between the magnetic head and the magnetic tape in this state, the gaseous-phase lubricant adhering to the magnetic head surface is oxidized before silicone and others are oxidized and, since the gaseous-phase lubricant itself is oxidized and decomposed to vaporize away, the surface of the magnetic head is kept in a clean state.

Even if the gaseous-phase lubricant adhering to the magnetic head surface is oxidized and decomposed, the gaseous-phase lubricant adheres again to the magnetic head because the inside of the case is filled with an atmosphere of the gaseous-phase lubricant, and the adhering gaseous-phase lubricant is oxidized. Therefore, the energy for oxidizing silicone and others does not reach these, and the oxides of silicone and others are not generated.

By repetition of these, the magnetic head is in a state of being protected by the coating film of the gaseous-phase lubricant as long as the inside of the case is filled with the atmosphere of the gaseous-phase lubricant, so that foreign substances other than the gaseous-phase lubricant do not adhere to the magnetic head.

The gaseous-phase lubricant is preferably disposed in a neighborhood of the magnetic head. This allows the magnetic head to be maintained in the atmosphere of the gaseous-phase lubricant with certainty.

Further, the gaseous-phase lubricant is preferably disposed by impregnation in a porous impregnation material. This allows the gaseous-phase lubricant in a liquid state to be held in the numerous impregnation pores of the porous impregnation material. As the porous impregnation material, for example, sintered metal or ceramics may be used.

Alternatively, the gaseous-phase lubricant is preferably disposed in a neighborhood of the magnetic head by being contained in a grease. This allows the gaseous-phase lubricant in either a liquid or a solid state to be held favorably. The grease may be such that uses as its thickening agent metal soap or silica gel, for example.

Thus, the gaseous-phase lubricant gradually vaporizes to fill the inside of the case with the atmosphere of the gaseous-phase lubricant for a long period of time. This is due to the fact that, since a constant vapor pressure is maintained in a case that forms an almost closed space, the gaseous-lubricant in the impregnation pores vaporizes into air until it reaches an equilibrium.

As the gaseous-phase lubricant, at least one kind among the following compounds can be suitably used:
1) paraffins
2) monoalcohols having a single —OH group
3) polyalcohols having plural —OH groups 4) ethers having a single or plural —O— bonds
5) cyclic ethers
6) ketones having a single or plural —CO— bonds
7) etheralcohols having a single or plural —OH groups
8) esteralcohols having a single or plural —OH groups
9) esters having a single or plural —COO— bonds
10) aminoalcohols having a single or plural —OH groups
11) aliphatic acids having a single or plural —COOH groups
12) alkylamides having a single or plural —CONH bonds
13) primary amines having a single or plural —NH$_2$ bonds
14) secondary amines having a single or plural —NH— bonds
15) tertiary amines having a single or plural N≡ bonds
16) oxymonocyclic terpenes.

If plural kinds of gaseous-phase lubricants are to be used, those that do not react with each other are mixed or separately disposed.

Specifically, the following compounds can be suitably used as the gaseous-phase lubricants.
1 paraffins
2,2,4-trimethylpentane . . . 99.2° C. (boiling point under 1 atm.)
n-decane . . . 174.1° C. (boiling point under 1 atm.)
n-dodecane . . . 216.3° C. (boiling point under 1 atm.)
tetradecane . . . 253.6° C. (boiling point under 1 atm.)
2 monoalcohols having a single —OH group
n-propyl alcohol . . . 97.2° C. (boiling point under 1 atm.)
isobutyl alcohol . . . 106 to 109° C. (boiling point under 1 atm.)
isoamyl alcohol . . . 128 to 132° C. (boiling point under 1 atm.)
isobutylcarbinol . . . 176 to 184° C. (boiling point under 1 atm.)
3 polyalcohols having plural —OH groups
propylene glycol . . . 187° C. (boiling point under 1 atm.)
ethylene glycol . . . 197° C. (boiling point under 1 atm.)
diethylene glycol . . . 250° C. (boiling point under 1 atm.)
2-methyl-2,4-pentanediol . . . 197.4° C. (boiling point under 1 atm.)
glycerin . . . 290° C. (boiling point under 1 atm.)
4 ethers having a single or plural —O— bonds
n-butyl ether . . . 143° C. (boiling point under 1 atm.)
isoamyl ether . . . 173.2° C. (boiling point under 1 atm.)
5 cyclic ethers
1,4-dioxane . . . 101.4° C. (boiling point under 1 atm.)
1,3-dioxane . . . 106° C. (boiling point under 1 atm.)
6 ketones having a single or plural —CO— bonds
cyclopentanone . . . 130.7° C. (boiling point under 1 atm.)
2-octanone . . . 174° C. (boiling point under 1 atm.)
2-nonanone . . . 195° C. (boiling point under 1 atm.)
2-undecanone . . . 229° C. (boiling point under 1 atm.)
7 etheralcohols having a single or plural —OH groups
1,3-dimethoxy-2-propanol . . . 169° C. (boiling point under 1 atm.)
diethylene glycol monomethyl ether . . . 194.2° C. (boiling point under 1 atm.)
diethylene glycol monoethyl ether . . . 195° C. (boiling point under 1 atm.)
diethylene glycol monobutyl ether . . . 230° C. (boiling point under 1 atm.)
tripropylene glycol monomethyl ether . . . 242.4° C. (boiling point under 1 atm.)
8 esteralcohols having a single or plural —OH groups
ethyl lactate . . . 154° C. (boiling point under 1 atm.)
ethyl glycolate . . . 160° C. (boiling point under 1 atm.)
2-hydroxyethyl acetate . . . 188° C. (boiling point under 1 atm.)
diethyl L-malate . . . 253° C. (boiling point under 1 atm.)
9 esters having a single or plural —COO— bonds
dimethyl succinate . . . 195° C. (boiling point under 1 atm.)
ethyl octanoate . . . 208° C. (boiling point under 1 atm.)
diethyl fumarate . . . 214° C. (boiling point under 1 atm.)
diethyl decanoate . . . 242° C. (boiling point under 1 atm.)
diethyl adipate . . . 245° C. (boiling point under 1 atm.)
10 aminoalcohols having a single or plural —OH groups
diethylethanolamine . . . 163° C. (boiling point under 1 atm.)
dibutylethanolamine . . . 199° C. (boiling point under 1 atm.)
11 aliphatic acids having a single or plural —COOH groups
pivalic acid . . . 164° C. (boiling point under 1 atm.)
isocrotonic acid . . . 169° C. (boiling point under 1 atm.)
isovaleric acid . . . 177° C. (boiling point under 1 atm.)
adipic acid . . . 205.5° C. (boiling point under 1 atm.)
hexanoic acid . . . 205.8° C. (boiling point under 1 atm.)
n-octanoic acid . . . 239° C. (boiling point under 1 atm.)
crotonic acid . . . 189° C. (boiling point under 1 atm.)
12 alkylamides having a single or plural —CONH— bonds
n-ethylacetamide . . . 205° C. (boiling point under 1 atm.)
13 primary amines having a single or plural —NH$_2$ bonds
2-octaneamine . . . 163 to 164° C. (boiling point under 1 atm.)
octylamine . . . 188° C. (boiling point under 1 atm.)
hexylamine . . . 130° C. (boiling point at 762 mmHg)
1,6-hexanediamine . . . 81.5° C. (boiling point at 10 mmHg)
14 secondary amines having a single or plural —NH— bonds
dibutylamine . . . 160° C. (boiling point under 1 atm.)
15 tertiary amines having a single or plural N≡ bonds
tripropylamine . . . 157° C. (boiling point under 1 atm.)
tributylamine . . . 212° C. (boiling point under 1 atm.)
16 oxymonocyclic terpenes
γ-terpineol . . . 114 to 115° C. (boiling point under 1 atm.)
β-terpineol . . . 209 to 210° C. (boiling point at 752 mmHg)
α-terpineol . . . 219 to 221° C. (boiling point under 1 atm.)
1-menthol . . . 216.5° C. (boiling point under 1 atm.)
d-camphor . . . 209° C. (boiling point under 1 atm.)

These compounds have a boiling point of less than about 100 to 250° C. under one atmospheric pressure, vaporize at an atmosphere temperature under a device use environment of −10° C. to +60° C., fill the inside of the case with an atmosphere of the gaseous-phase lubricant, adhere easily to a metal of the magnetic head or the like by its polar group, and are, when oxidized, decomposed into water and carbon dioxide to completely vaporize away, thereby satisfying the aforesaid conditions.

Therefore, by disposing such a compound in the inside of the case that incorporates a mechanism having a magnetic head, the adhesion of foreign substances to the magnetic head can be eliminated and the reading precision decrease of the magnetic data caused by the foreign substances can be prevented.

BRIEF DESCRIPTION OF THE DRAWINGS

FIG. 2 is a schematic perspective view illustrating an appearance of the video tape recorder shown in FIG. 1.

DESCRIPTION OF THE PREFERRED EMBODIMENTS

Figure 1:
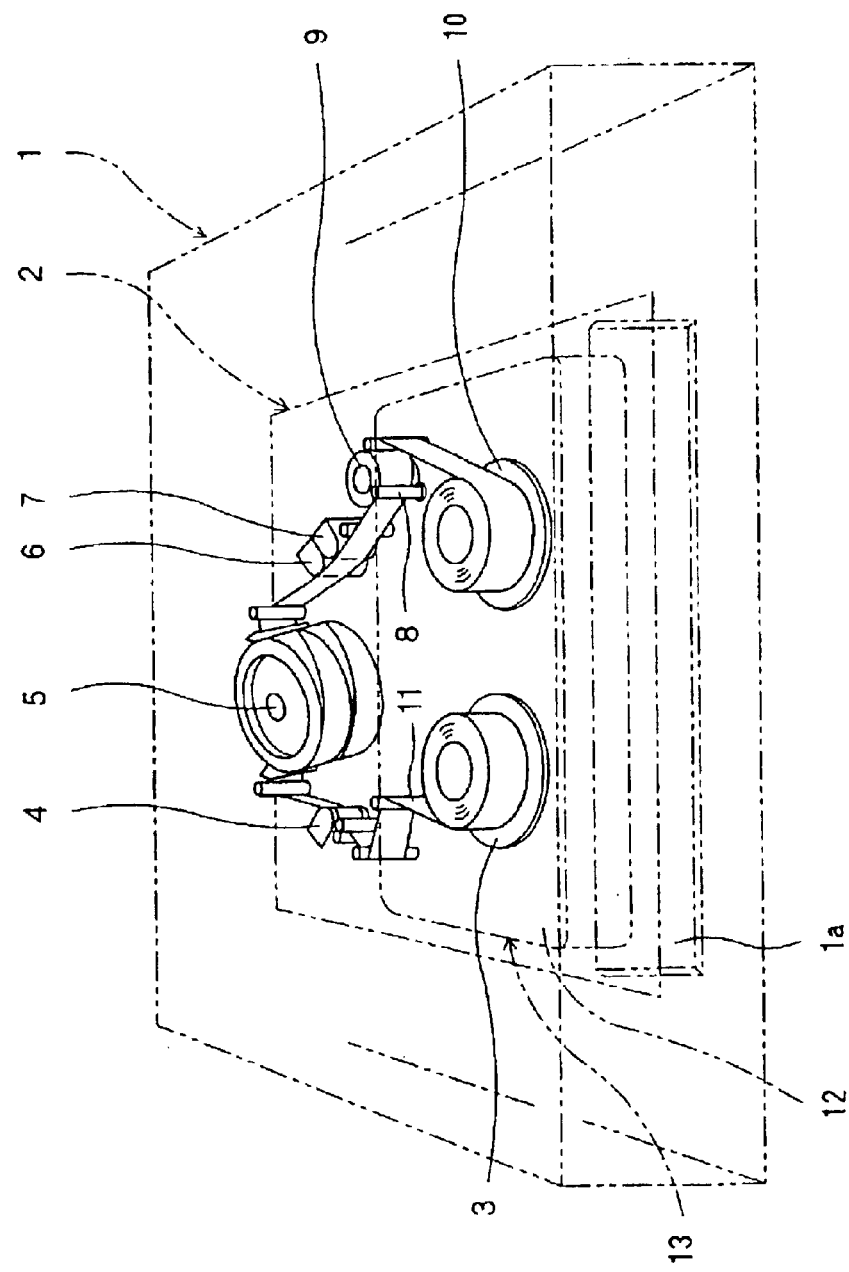
FIG. 1 is a schematic perspective view illustrating a mechanism part of a video tape recorder according to one embodiment of the present invention.

Hereafter, preferred embodiments of the present invention will be described with reference to the drawings.

In a video tape recorder shown in FIGS. 1 and 2, an outer case 1 made of plastics or the like incorporates a tape mechanism 2 therein, i.e. a feeding reel 3, a whole-width erasing head 4, a rotary video head 5 that performs recordation or the like of an image signal, a voice signal, and a control signal, a voice erasing head 6, a voice control head 7, a capstan 8, a pinch roller 9, and a winding reel 10. Further, a tape cassette 13 is set in which a magnetic tape 11 that runs by the aforesaid feeding reel 3 and the winding reel 10 is housed in a case 12. The symbol 1a represents a door body that covers the cassette entrance/exit disposed in the outer case 1.

A porous impregnation material 14 impregnated with a gaseous-phase lubricant that vaporizes at an atmosphere temperature inside the outer case 1, which is here a brass sintered body impregnated with glycol or a polyalcohol, is disposed on the inside surface of the outer case 1 in a neighborhood of the rotary video head 5.

By this, even if the magnetic recording and reproducing device is used under an environment with an outer air temperature of 60° C. and an outer air humidity of 5%, the polyalcohol held by the numerous impregnation pores of the porous impregnation material 14 gradually vaporizes at the atmosphere temperature within the outer case 1, and the inside of the outer case 1 was filled with the atmosphere.

As a result, the surface of the magnetic head including the rotary video head 5 was brought into a state of being covered with a coating film of the gaseous-phase lubricant, whereby silicone and others present in air did not adhere, and the deterioration of the reading precision of the magnetic data caused by the residual of oxides of silicone and others as foreign substances, which was the conventional problem, did not occur. Also, although there is a possibility that a slight amount of organic substances having an unsaturated bond is present in air, the adhesion thereof was prevented in the same manner as silicone, and the residual of their oxides was not generated.

Similar effects were obtained when 1,6-hexadiol, propylene glycol, ethylene glycol was used in place of glycol.

Here, the gaseous-phase lubricant may be stuck onto the inside of the outer case 1 by impregnation in a porous impregnation material 14 such as a sintered metal or ceramics of the aforesaid brass sintered body or the like, or a part of the outer case or another component member may be formed of a porous impregnation material and impregnated. Also, it is possible to apply a gaseous-phase lubricant onto the outer case 1 or another component member, and it is also preferable to mix a gaseous-phase lubricant into a grease and to apply the grease onto a neighborhood of the rotary head 5.

The position for disposing the gaseous-phase lubricant is not limited to the aforesaid neighborhood of the rotary video head 5. It may be a position in the inside of the outer case 1 so that the inside of the outer case 1 can be filled with the atmosphere of the gaseous-phase lubricant.

Also, in the above description, a video tape recorder has been explained; however, similar effects are obtained by disposing a gaseous-phase lubricant in other magnetic recording and reproducing devices such as a magnetic tape device, a magnetic disk device, or a magnetic card device.

What is claimed is:

1. A magnetic recording and reproducing device comprising a case holding therein a gaseous-phase lubricant and a magnetic head having a surface for contacting a magnetic tape, wherein a surface of the magnetic head is for receiving a film thereon deposited by the gaseous-phase lubricant at ambient temperature, said gaseous-phase lubricant being selected from the group consisting of:

paraffins, primary amines having a single or plural $NH_2$ bonds, secondary amines having a single or plural —NH— bonds, tertiary amines having a single or plural $N\equiv$ bonds, and oxymonocyclic terpenes.

2. The magnetic recording and reproducing device according to claim 1, wherein the gaseous-phase lubricant is located adjacent the magnetic head.

3. The magnetic recording and reproducing device according to claim 1, further comprising a porous impregnation material, wherein the gaseous-phase lubricant is located in the porous impregnation material.

4. The magnetic recording and reproducing device according to claim 1, further comprising a grease, wherein the gaseous-phase lubricant is located adjacent the magnetic head and in the grease.

5. A magnetic recording and reproducing device comprising a case holding a gaseous-phase lubricant and a mechanism comprising a magnetic head having a surface for contacting a magnetic tape, wherein a surface of the magnetic head is for receiving a film thereon deposited by the gaseous-phase lubricant at ambient temperature, gaseous-phase lubricant being selected from the group consisting of:

ketones having a single or plural —CO— bonds, ether alcohols having a single or plural —OH groups, ester alcohols having a single or plural —OH groups, esters having a single or plural —COO— bonds, aminoalcohols having a single or plural —OH groups, and alkylamides having a single or plural —CONH bonds.

6. The magnetic recording and reproducing device according to claim 5, wherein the gaseous-phase lubricant is located adjacent the magnetic head.

7. The magnetic recording and reproducing device according to claim 5, further comprising a porous impregnation material, wherein the gaseous-phase lubricant is located in the porous impregnation material.

8. The magnetic recording and reproducing device according to claim 5, further comprising a grease, wherein the gaseous-phase lubricant is located adjacent the magnetic head and in the grease.

* * * * *